United States Patent [19]
Nichols

[11] 4,012,888
[45] Mar. 22, 1977

[54] PACKAGING APPARATUS FOR FORMING, FILLING AND SEALING RECEPTACLES

[75] Inventor: Matthew Nichols, Norristown, Pa.

[73] Assignee: Packaging Coordinators, Inc., Philadelphia, Pa.

[22] Filed: July 31, 1975

[21] Appl. No.: 600,837

[52] U.S. Cl. .................................. 53/131; 53/141; 53/184 R

[51] Int. Cl.² ................... B65B 5/02; B65B 11/52; B65B 61/26

[58] Field of Search ............ 53/22 A, 30 R, 112 A, 53/184 R, 180 R, 329, 131, 141

[56] References Cited
UNITED STATES PATENTS

| | | | |
|---|---|---|---|
| 1,895,899 | 1/1933 | Schaub | 53/30 X |
| 2,826,025 | 3/1958 | Swartz | 53/180 |
| 2,958,168 | 11/1960 | Vogt | 53/30 |
| 3,000,157 | 9/1961 | Ollier et al. | 53/184 |
| 3,354,611 | 11/1967 | Powell | 53/184 |
| 3,400,811 | 9/1968 | Panicci | 53/30 X |

*Primary Examiner*—Robert Louis Spruill
*Attorney, Agent, or Firm*—Charles A. McClure

[57] ABSTRACT

Blister packaging of medicaments or the like is accomplished in a succession of discrete stages to provide unit-dose packages in strip form, with one or more blisters per strip. Modular machinery to do so is powered from electrical and pressurized fluid energy sources, and the respective modules abut one another sequentially and conduct the fluid to actuate the various stages.

14 Claims, 23 Drawing Figures

Fig. II

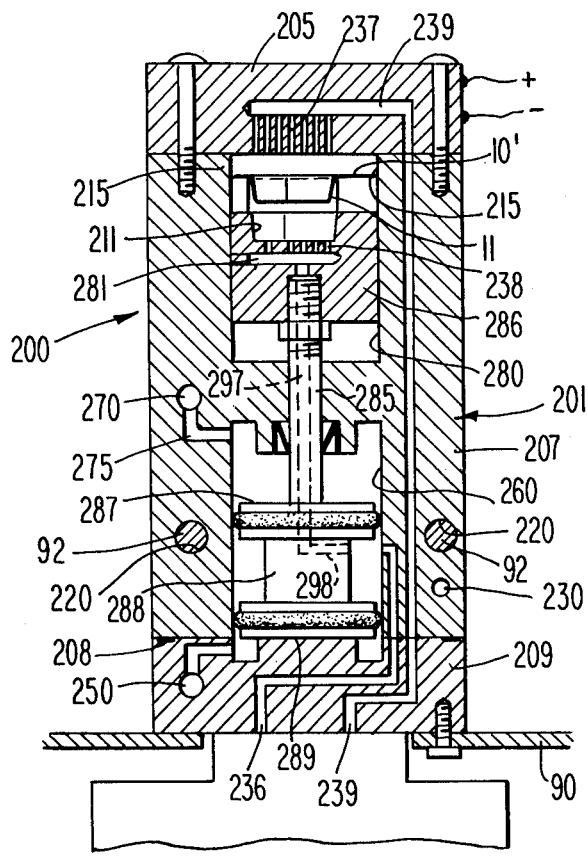
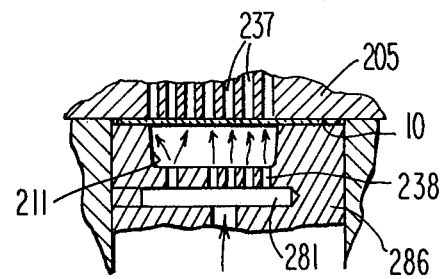
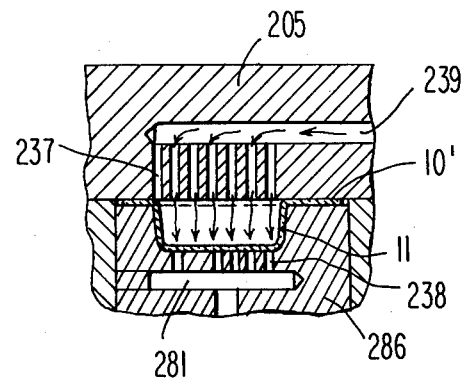
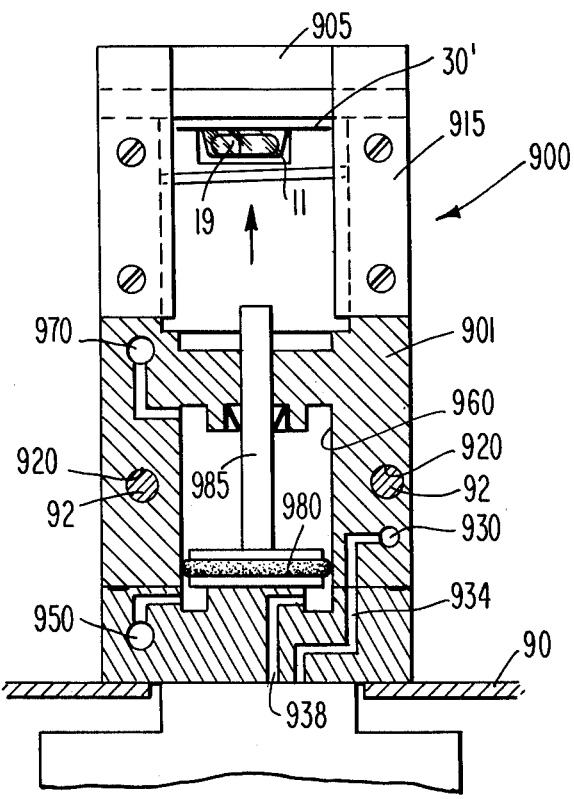
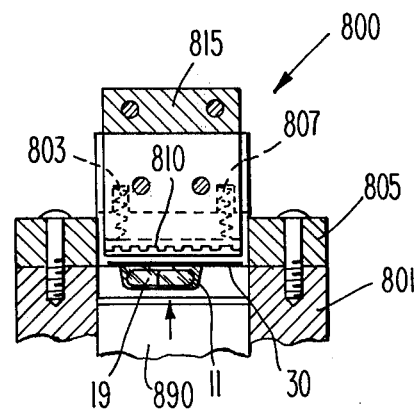
Fig. 15
Fig. 16
Fig. 17
Fig. 23
Fig. 22

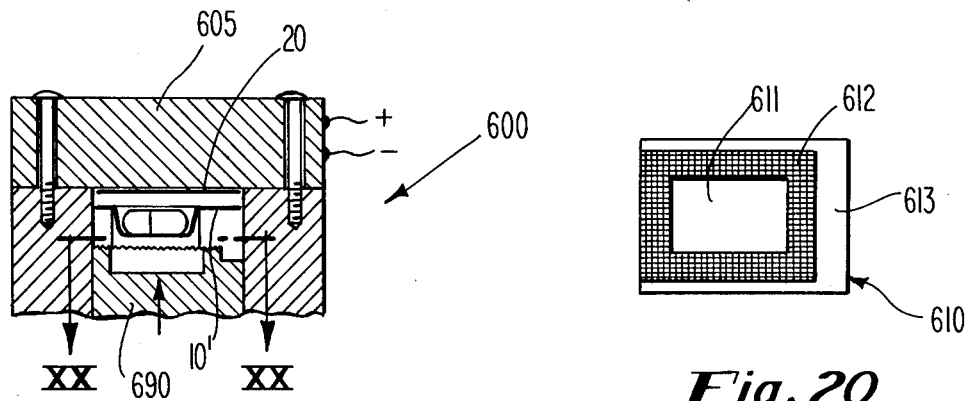
Fig. 19
Fig. 20
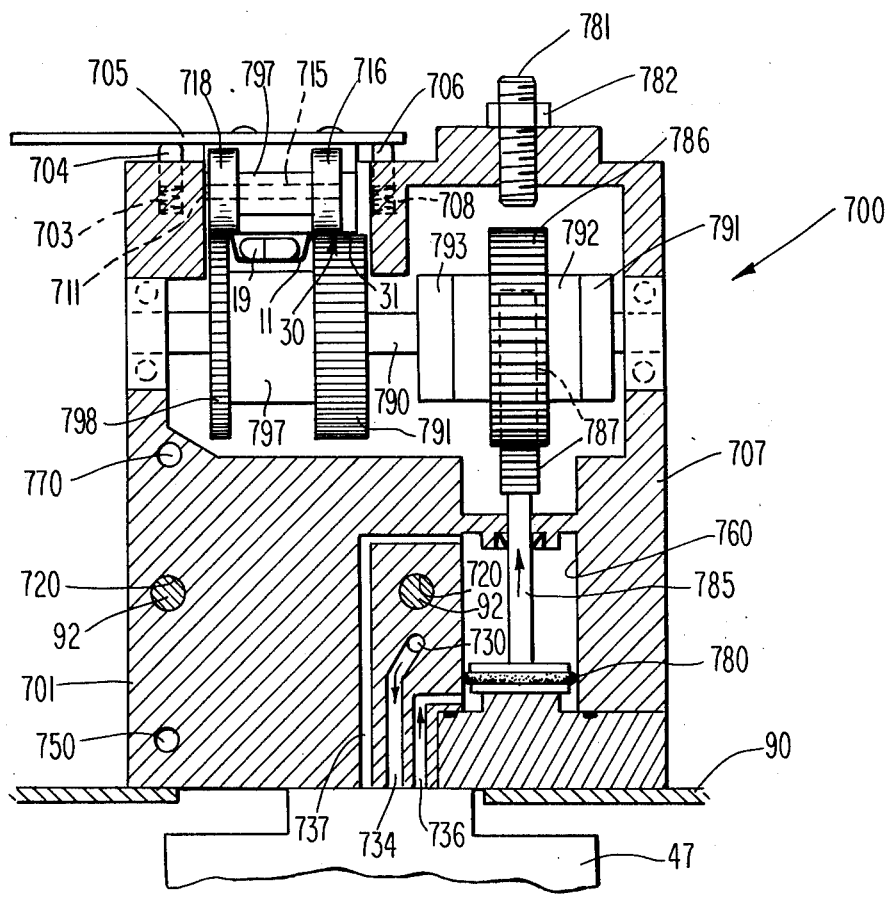
Fig. 21 ically of unit doses.
PACKAGING APPARATUS FOR FORMING, FILLING AND SEALING RECEPTACLES This application relates to packaging of medicaments or the like, especially blister packaging of unit doses.

Packaging machinery customarily includes a bewildering array of wiring, tubing, and mechanical components so that a machine operator either has relatively little awareness of what is going on and is, consequently, unable to do more than call a repairman if anything malfunctions or, alternatively, has to become an expert on its structure and operation, but such expertise is not readily transferable to another packaging machine. Conventional machinery of that sort is also relatively inflexible to changes in number and sequence of packaging operations.

A primary object of the present invention is packaging of medicaments or the like in strip-like unit-dose packages.

A further object is utilization of all the strip material in such packaging, without converting any of such material into waste.

Another object is provision of modular machinery for performing such packaging, with modules performing discrete packaging steps and being readily removed and replaced or rearranged.

A still further object is such a packaging machine in table-top configuration.

Other objects of this invention, together with means and methods for attaining the various objects, will be apparent from the following description and the accompanying diagrams of a preferred embodiment thereof, which is presented by way of example rather than limitation.

FIGS. 1 to 8 constitute a sequence of fragmentary perspective views of packaging material in strip form at successive stages in being treated according to the present invention:

FIG. 15 is a transverse sectional elevation, taken at XV—XV on FIG. 14, showing the machine module for forming the blister hollows;

FIG. 16 is a fragmentary sectional elevation of the FORM module showing the deformable strip material at an early stage of blister formation; and FIG. 17 is a fragmentary sectional elevation of the same module at a later stage in such formation.

FIG. 19 is a fragmentary sectional elevation of the head portion of the machine module for sealing the respective strips together; and FIG. 20 is a plan view of part of the SEAL module, taken at XX—XX on FIG. 19.

FIG. 21 is a transverse sectional elevation, taken at XXI—XXI on FIG. 14, showing the machine module for transporting the strip material from one module to another;

FIG. 22 is a transverse sectional elevation, taken at XXII—XXII on FIG. 14, showing the machine module for perforating the resulting packaging strip as desired; and FIG. 23 is a fragmentary sectional elevation showing the knife for cutting the packaging strip into respective individual or multiple package pieces.

In general the objects of the present invention are accomplished, in blister packaging of medicaments or the like, by intermittently transporting blister-forming strip material along a succession of treatment stations, including one at which it has blister-like hollows formed succesively therein, and backing strip material juxtaposed to the blister-forming strip material and sealed thereagainst, thereby forming unit-dose packages in strip form without converting any of such strip material into waste. A machine embodiment thereof comprises a succession of treating stations arranged in-line and upstanding from one another in treating sequence, and having registering bores therein for flow of pressurized actuating fluid between stations.

FIGS. 1 to 8 show fragmentarily the conditions of the striplike packaging material at successive stations in its treatment according to this invention.

Figure 1:
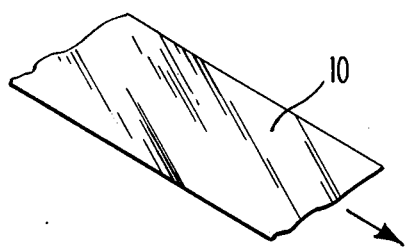
FIG. 1 shows an untreated blister-forming strip of deformable material.

FIG. 1 shows guided untreated heat-deformable or blister strip material 10 being transported horizontally lengthwise in the direction indicated by the arrow.

Figure 2:
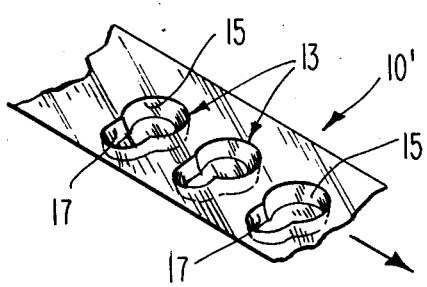
FIG. 2 shows the same strip after formation of blister-like hollows therein.

FIG. 2 shows the blister strip material (denoted 10′) after the next stage in its treatment, in which it is indented from the upper side into a series of blister-like downward protrusions, producing corresponding hollows 13 visible from above as shown. Each hollow is keyhole-shaped, being made up of rounded cylindrical portion 15 and intersecting smaller lobe 17 extending to one lateral edge.

Figure 3:
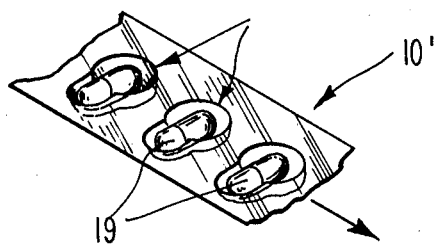
FIG. 3 shows the same strip with a capsule in each such hollow therein.

FIG. 3 shows the same blister strip material with capsules 19 therein, one such capsule lying laterally in each hollow 13.

Figure 4:
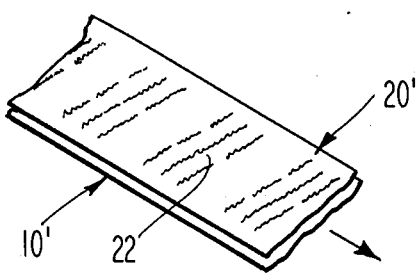
FIG. 4 shows a printed strip of backing material overlying the blister strip.

FIG. 4 shows backing strip material 20′, with printing 22 thereon, overlying and juxtaposed to blister strip material 10′ and being transported therewith in the arrow direction.

Figure 5:
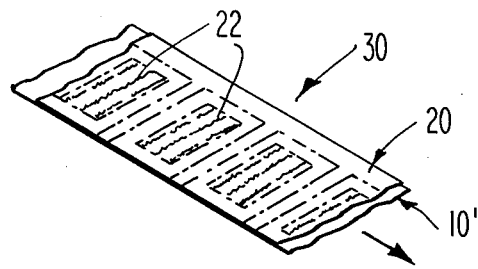
FIG. 5 shows the same two strips sealed together.

FIG. 5 shows the respective strip materials sealed together to form package laminate 30.

Figure 6:
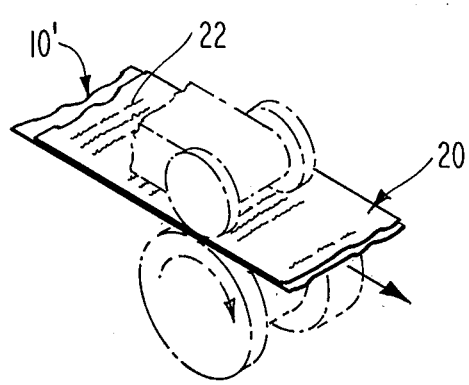
FIG. 6 shows the laminate of two strips of the preceding view being forwarded by being gripped along its opposite edges.

FIG. 6 shows the package laminate being transported in essentially non-slipping contact by rollers 39 along (above and below) opposite rule margins.

Figure 7:
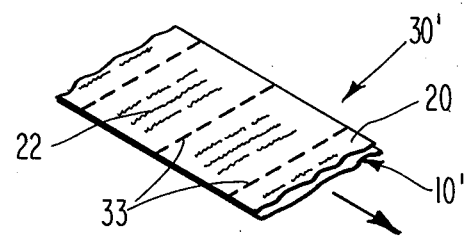
FIG. 7 shows the same laminate perforated transversely between successive blister portions.

FIG. 7 shows the package laminate (denoted as 30') after having been perforated transversely at lines 33, one between each adjacent pair or unit-dose package portions.

Figure 8:
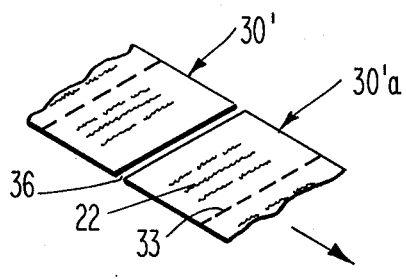
FIG. 8 shows the same laminate severed along such a perforation.

FIG. 8 shows the package laminate severed transversely by cut 36 along one of the perforated lines to separate package piece 30'a from strip 30'. Here the package piece is shown as comprising more than one unit-dose package. It will be understood that the laminated package strip could be severed as well between successive unit-dose package portions (without necessity of prior perforation) to produce a succession of individual unit-dose packages.

Figure 9:
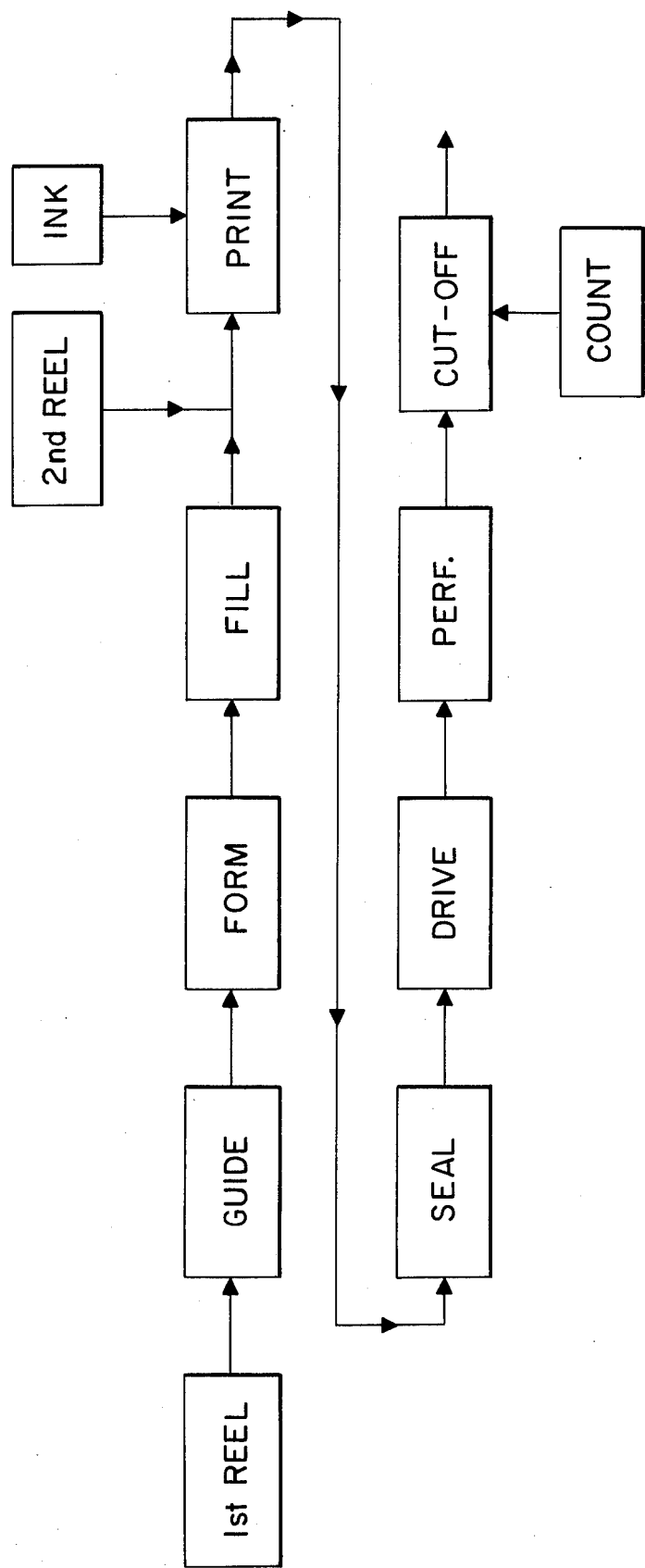
FIG. 9 is a schematic diagram of the stages in treatment of such packaging strips and resulting laminated packages.
Figure 10:
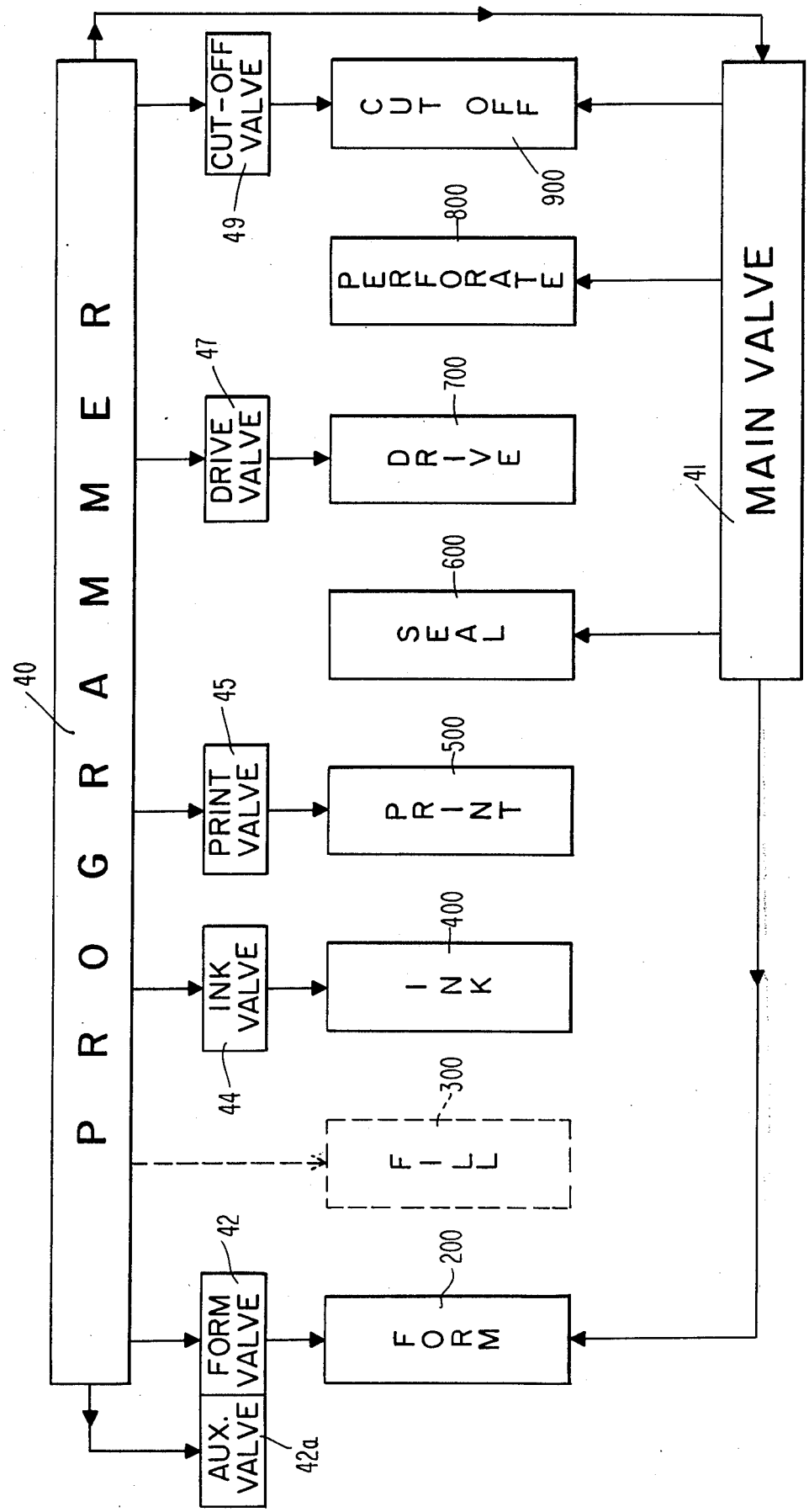
FIG. 10 is a schematic diagram of the programming of such stages via a programmer and valves.
Figure 11:
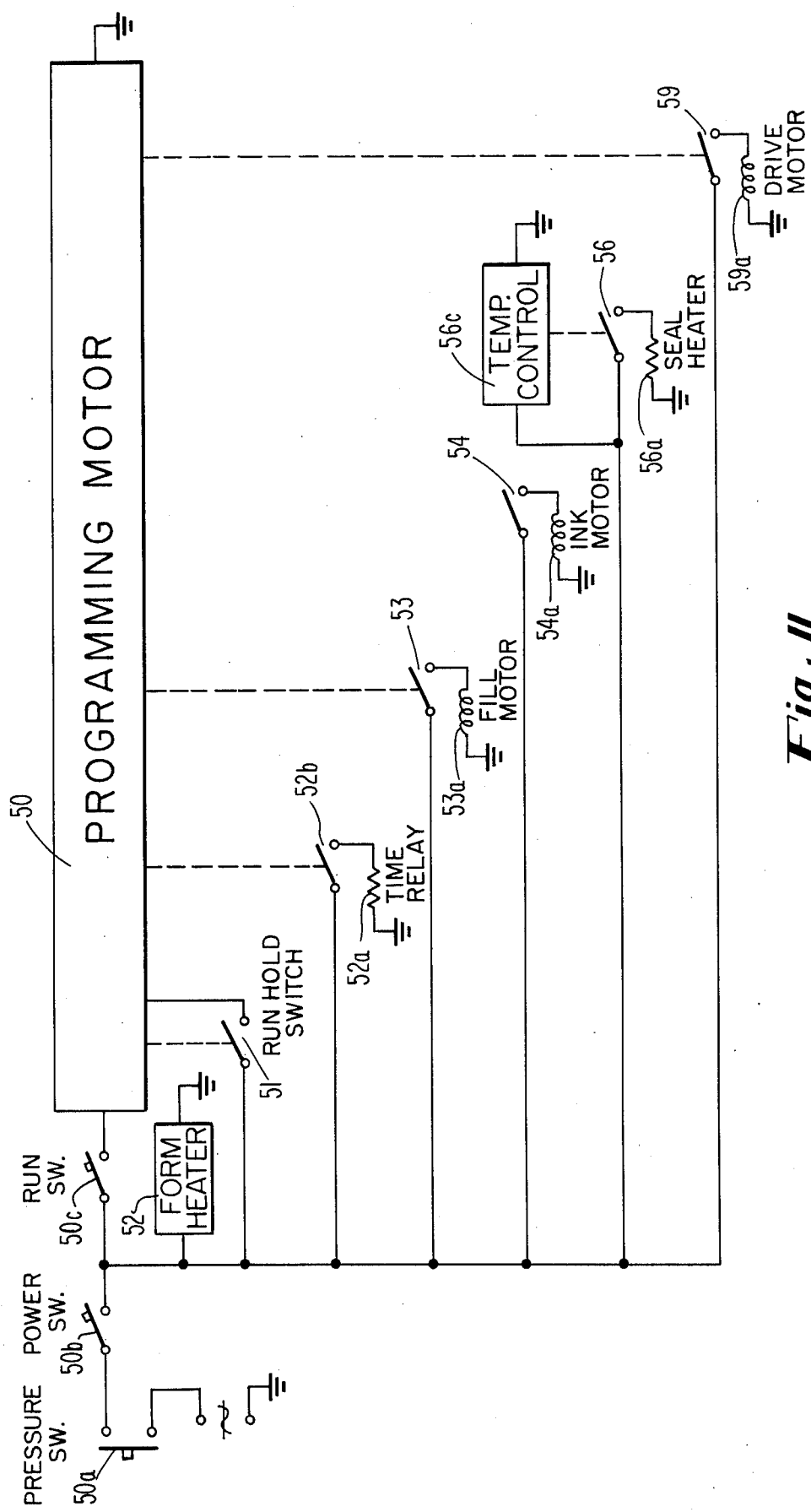
FIG. 11 is an electrical schematic diagram showing the programming motor, programmed electrical components, and intervening valves and switches.

FIGS. 9 to 11 are a succession of schematic diagrams to show flow, mechanical, and electrical features particularly.

FIG. 9 shows the flow of the heat-deformable strip material from the 1st REEL through a GUIDE stage in which the material is wiped, tensioned, and guided to the FORM stage in which the blister-like indentations are made, and then to the FILL stage in which the appropriate unit-dose of medicament or the like is inserted into each hollow so formed in the first strip material.

Immediately following the FILL stage, the backing strip material is supplied from the 2d REEL and is juxtaposed in overlying position relative to the first strip material, and they are forwarded together through the PRINT stage, which has adjunct INK stage, to print the exposed upper face of the backing material before being sealed together in the followng SEAL stage, leaving only a narrow marginal portion along one side edge unsealed to facilitate subsequent opening. The resulting strip of package laminate passes next through the DRIVE stage in which it is gripped along its opposite edges from both above and below and is transported intermittently, pausing for performance of the other treating steps, on to the PERF. stage in which it is perforated tranversely between successive unit-dose package portions, and on to the CUT-OFF stage, controlled by an adjunct COUNT stage, to be severed at desired intervals, i.e., with a desired number of unit-dose package portions making up each successive package strip.

FIG. 10 shows PROGRAMMER 40 with arrowed lines interconnecting it to MAIN VALVE 41 and various other valves which are connected in turn to one or more of eight stations (corresponding to process stages of the preceding view), some of which are connected directly to the programmer instead of or in addition to one of the valves. FORM station 200 is connected to receive fluid flow from both the main valve and FORM valve 42 as will be described in further detail below. AUX. valve 41a is programmed to control the availability of low-pressure fluid to the form valve. FILL station 300 is shown interconnected to the programmer by broken lines to suggest that a mechanical feeder to place the medicaments or the like into the blister hollows is optional, as that entire step can readily be performed manually. INK station 400 and PRINT station 500, as well as SEAL station 600 are interconnected to the programer via INK valve 44, PRINT valve 45, and SEAL valve 46, respectively. SEAL station 600 and PERFORATE station 800 are interconnected only to the main valve, whereas CUT-OFF station 900 is connected to both CUT-OFF valve 49 and the main valve. Details of the construction of each station are given below, but in general the interconnection from the programer is mechanical or electromechanical, and from the valves is pneumatic (or, alternatively, hydraulic).

FIG. 11 shows electrical components energized through mechanical (cam) switches operated from the programmer, which has electrical PROGRAMMING MOTOR 50 connected between ground and the hot conductor of an electrical circuit in which are interposed PRESSURE SWITCH 50a, POWER SWITCH 50b, and RUN SWITCH 50c in series. Branch electrical lines to individual electrical components are fed from the hot conductor to which they interconnect via a common conductor to the junction of the power and run switches. The first such component is FORM HEATER 52, which is not programmed (i.e., it operates continuously when the machine is operating). The next such component is RUN HOLD SWITCH 54, which completes the circuit to the programming motor until the end of a program cycle despite intervening opening of the run switch. Mechanical interconnection to the programming motor is indicated by broken lines. The remaining programmed electrical components include both a switch and a resistance winding or an inductance winding as shown.

TIME DELAY switch 52b and resistance winding 52a are adjunct to FORM VALVE 42 of FIG. 10. Optional FILL MOTOR switch 53 and winding 53a are located in FILL station 300 of that view when a mechanical feeder is used. INK MOTOR switch 57 and winding 57a are located in INK stage 400 and are not programmed. SEAL HEATER resistance winding 56a is located in SEAL stage 600, and its switch 56 is actuated by TEMP. CONTROL unit 56c. DRIVE MOTOR switch 59 and winding 59a are located in DRIVE stage 700 also shown in FIG. 10.

The sequence of treatment of packaging materials in stages to package medicaments or the like according to this invention is apparent, together with the general characteristics of suitable modular machine stations, from the foregoing description and diagrams. Description of general mechanical features of the subject machine is given next, to be followed by more detailed description of certain of the modular stations.

Figure 12:
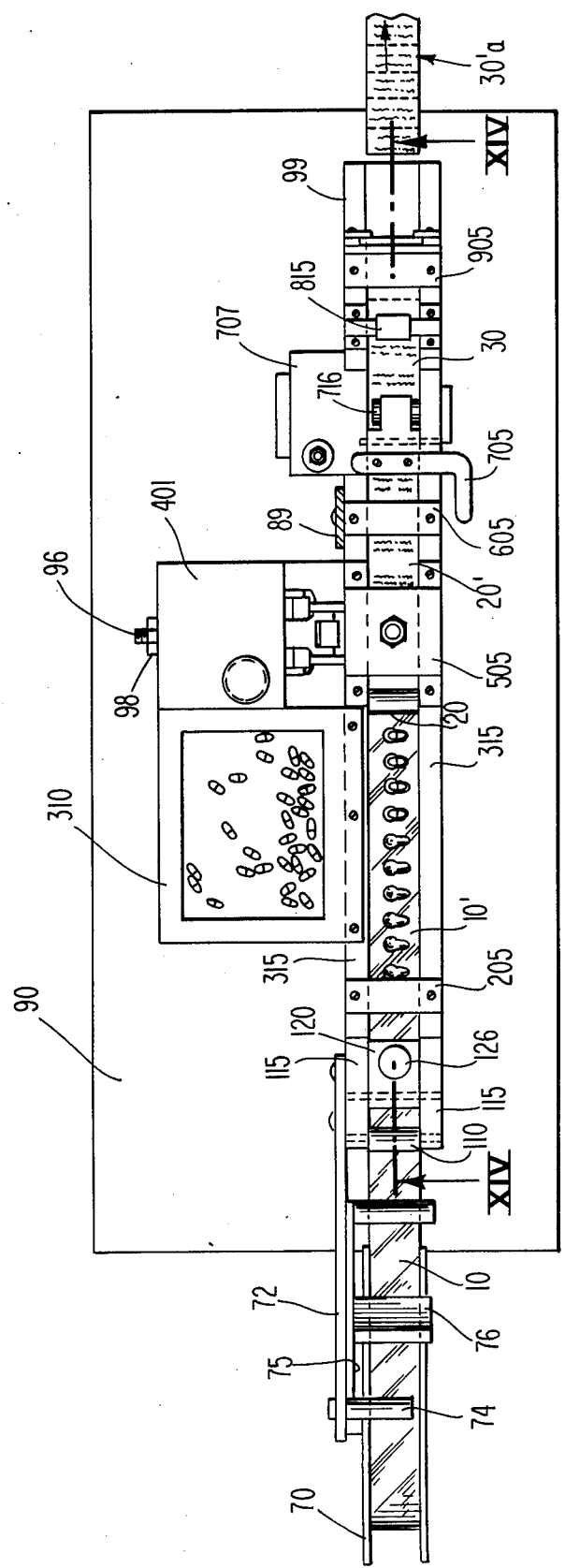
FIG. 12 is a plan view of a corresponding machine embodiment of the invention, with the supply reel for the backing strip sectioned away.
Figure 13:
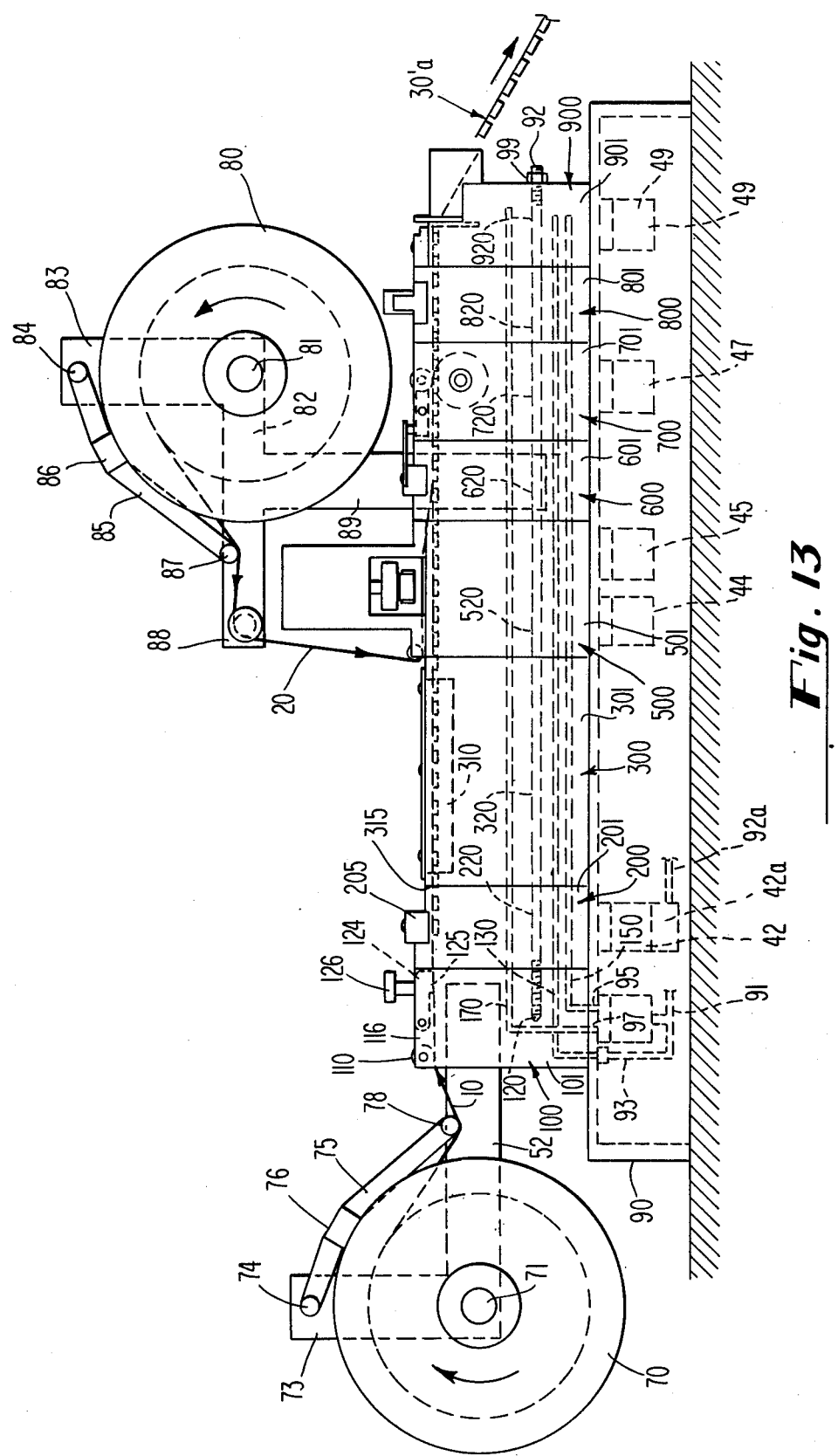
FIG. 13 is a side elevation of the machine upstanding from its base, with certain interior features indicated in broken lines.
Figure 14:
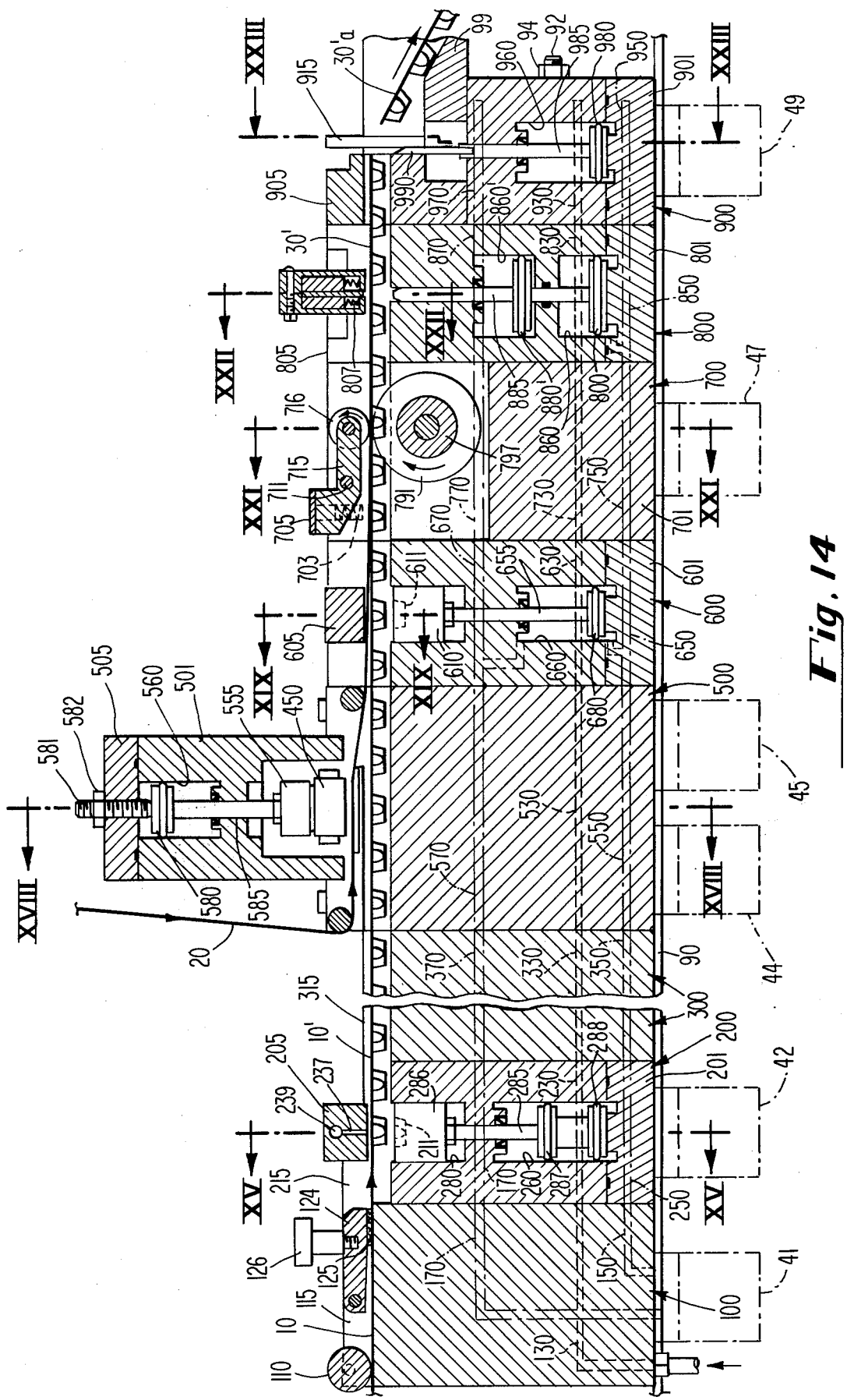
FIG. 14 is a longitudinal sectional elevation taken at XIV—XIV on FIG. 12.

FIGS. 12, 13, and 14 show the machine in general outline and increasing detail, from the top and side, unsectioned and then sectioned, as already mentioned. It should be understood that the longitudinal extent of any station in the transport direction is a functon of the modular length of the individual package increment and that in length most stations will be an integral multiple thereof, preferably odd, to center a package portion along the station, but that a half-length may be used wherever desired for the package portions to straddle a midpoint, instead of being centered on it, at the swell intervals in the intermittent transporting thereof. Thus, the station length in the transport directon is $ns/2$ where $n$ is a positive integer, and $s$ is the intermittent transport distance.

From left to right, in FIGS. 12, 13, and 14, the machine module sequence is GUIDE station 100, FORM station 200, FILL station 300, INK station 400 and PRINT station 500, SEAL station 600, DRIVE station 700, PERFORATE station 800, and CUT-OFF station 900. Each station comprises a correspondingly designated block and related elements. The blocks are bolted together longitudinally by laterally spaced pair of bolts 92 (one visible, FIGS. 13, 14) threaded at one end into guide block 101 and protruding from cut-off block 901 at the CUT-OFF station, where nuts 94 are threaded thereonto, except that ink block 401 is secured laterally to print block 501 by bolt 96 with nut 98.

Heat-deformable blister strip 10 proceeds from left to right, is joined by backing strip 20 about midway, and the two combine into package strip 30, which exits at the right. Reel 70 for the blister strip is carried rotatably on spindle 71 supported by horizontal mounting bracket 72, which has upright extension 73 carrying pivoted arm 75 having roller 74 at the upper or pivoted end and roller 77 at the lower end (shown resting on strip 10) and fixed guide 76 therebetween. Similarly, reel 80 for the backing strip is carried rotatably on spindle 81 supported by horizontal bracket 82, which has upright extension 83 carrying pivoted arm 85 having roller 84 at the upper or pivoted end and roller 87 at the lower end (shown resting on strip 10) and fixed guide 86 therebetween. Horizontal bracket 82 for the latter reel is oriented toward horizontal bracket 72 for the former reel. Bracket 82 carries additional roller 88 at its forward end and itself is supported on upright 89 bolted to one side of seal block 601 located at SEAL station 600. Bracket 72 is bolted similarly to the side of guide block 101 at GUIDE station 100.

The respective station blocks are supported upstanding from base 90 of the machine to provide a level track for the strips of material in proceeding therealong, as shown most clearly in FIGS. 13 and 14. All the blocks except laterally displaced ink block 401 and DRIVE block 701 are of equal width; all are located in-line along the treatment path, as shown in FIG. 12. Pill tray 310 extends laterally from the side of fill block 301, and drive housing 707 extends laterally from drive block 701. Located in the base are the valves of FIG. 10, together with high-pressure air line 91 for main valve 41 and filtered low-pressure air line 92a for auxiliary valve 42a.

Extendng longitudinally through the station blocks from their entrance from the base via guide block 101 to their termination in cut-off block 901 are continuous high-pressure conduit 130 and lower 150 and upper 170 valved high-pressure conduits, which actuate various stages at the respective stations. The longitudinal bores that go to make up the air passageways in the respective blocks register when the respective station blocks are assembled and bolted together, and the fore and aft surfaces of the blocks are parallel and smooth enough to ensure that result. The compressed air (or other suitable fluid) provides the energy to actuate various operations at the individual stations, as programmed by way of the various valves. Each station is described in further detail below.

GUIDE station 100, as shown in FIGS. 12, 13, and 14, comprises block 101 upstanding from base 90 near the left end and located somewhat to the right of reel 70 and the guide elements associated with the reel. The top of the block is recessed from its left (upstream) to right (downstream) edges midway of its sides leaving pair of side rails 115 to receive heat-deformable strip 10 therebetween on the recessed surface. Guide roller 110 is pinned near the incoming edge to receive the strip thereunder. Next, wiper arm 124 pinned pivotally near about the midpoint of the rails extends eccentrically toward the downstream edge and terminates in flat wiping pad 125 juxtaposed to the recessed top surface of the block—but with the strip therebetween (as shown) during operation, of course. Knob 126 on top of the wiper arm enables it to be swung upward to receive the strip underneath the wiping pad and also weights it to ensure good wiping contact. The bottom of guide block 101 has continuous high-pressure bore 130 interconnecting to air conduit 93 from auxiliary valve 42a and has valved high-pressure bores 150 and 170 interconnecting to air conduits 95 and 97 from main valve 41 located within base 90 of the machine. All three bores exit from the vertical downstream face of the block, where they register with like bores in the next station block. Also present in the guide block is pair of threaded bores 120 receiving the ends of bolts 92, which secure the various stations together in their in-line configuration.

FORM station 200, shown in the last mentioned views and also in more detail in FIGS. 15 to 17, comprises block 201, which is bored internally to receive vertically movable piston components, as well as having pair of horizontal bores 220 for bolts 92 and continuous high-pressure 230 and valved high-pressure air bores 250 and 270 registering on its upstream edge with corresponding longitudinal bores 120, 130, 150, and 170 of the guide block and also registering in like manner at its downstream edge with corresponding bores in the next section. For ease of manufacture, block 201 is subdivided into base 209 screwed to machine base 90, body 207 sealed to the base by O-ring 208, and cap 205 bolted onto side rails 215. Leads + and − connect to FORM HEATER 52 (FIG. 11) of electrical resistance type located inside the cap. Low pressure filtered air from line 92a to auxiliary valve 42a in the base is connected therethrough to FORM VALVE 42, from which the air proceeds through machine base 90 (via lines not shown) and interconnecting either to bore 236, which returns through the block base and the adjacent part of the block body and into lower compartment 260, or to bore 239, which extends the entire length of the body and into the cap and above the top of forming piston 286 via upper and lower multiple passageways 237, 238. The forming piston, vertically reciprocable in the top compartment, has keyhole-shaped blister-forming depression 211 in its top surface and is interconnected by connecting rod 285 threaded into it to pistons 287 and 289 spaced apart by intermediate piece 288, which has bore 298 entering it laterally and joining vertical bore 297 through the connecting rod and the forming piston and into the blister-forming depression via the lower multiple passageways and intervening manifold 281. Valved high-pressure bores 270 and 250 have respective ports 275 and 255 interconnectng them with the lower compartment, respectively above and below the double piston.

Treatment of heat-deformable strip 10 by the FORM station occurs in the following sequence. As shown in FIG. 15, the pistons are held in the open or down position by high-pressure air from port 275 onto the top of piston 287 during movement of the strip, which is transported intermittently by the DRIVE station, as will be described below. During a dwell in the transporting of the strip, main valve 41 interchanges the high-pressure supply and exhaust between bores 270 and 250, whereupon air from port 255 below piston 289 forces the piston assembly upward to clamp the margins of the strip between the indented surface of the forming piston, as shown in FIG. 16. At the same time, auxiliary valve 42 releases filtered low-pressure air into lower compartment 260 via bore 236 and upward through bore 297 through piston rod 285 and into manifold 281 and on through passageways 238 into depression 211 in the top surface of the forming piston. Accumulated air pressure in the keyhole-shaped depression forces the overlying strip (as indicated by arrows) tightly against the bottom surface of the cap, which has passageways 237 therein, and conduction of heat from the resistance heating element in the cap softens the strip. After a heating period determined by TIME DELAY 55a, the auxiliary valve disconnects the low-pressure air supply from bore 236 and connects it to bore 239, whereupon as shown in FIG. 17 air-flow downward through passageways 237 in the cap forces the softened strip (as indicated by arrows) into the keyhole-shaped depression, thereby forming a blister-shaped protrusion therein. After a sufficient time in the latter position for the blister to cool, aided by the air-flow, main valve 41 returns the piston assembly to the open or down position, releasing the blister strip to be transported to locate the next untreated strip portion for forming. As shown, this station is three transport increments in length but, of course could be any length from one such modular increment upward inasmuch as it is the first active station and the blisters are formed in the heat-deformable strip here.

FILL station 300 comprises block 301, which is an integral number of modular transport increments long, corresponding to an equal number of blister hollows (ten shown in FIG. 13) to be filled, as with the indicated capsules, one each, extending transversely into the keyhole portion of the hollows. Tray 310 affixed to left rail 315 extends along that side of the station and holds capsule 325 for manual placement into the blister hollows in the strip, now designated at 10'. If desired, an automatic feed of conventional design may replace the tray. The block is bored longitudinally with pair of bores 320 for bolts 92, valved high-pressure bores 370 and 350, and continuous high-pressure bore 330—all registering with the corresponding bores in the blocks of the contiguous upstream and downstream stations.

Figure 18:
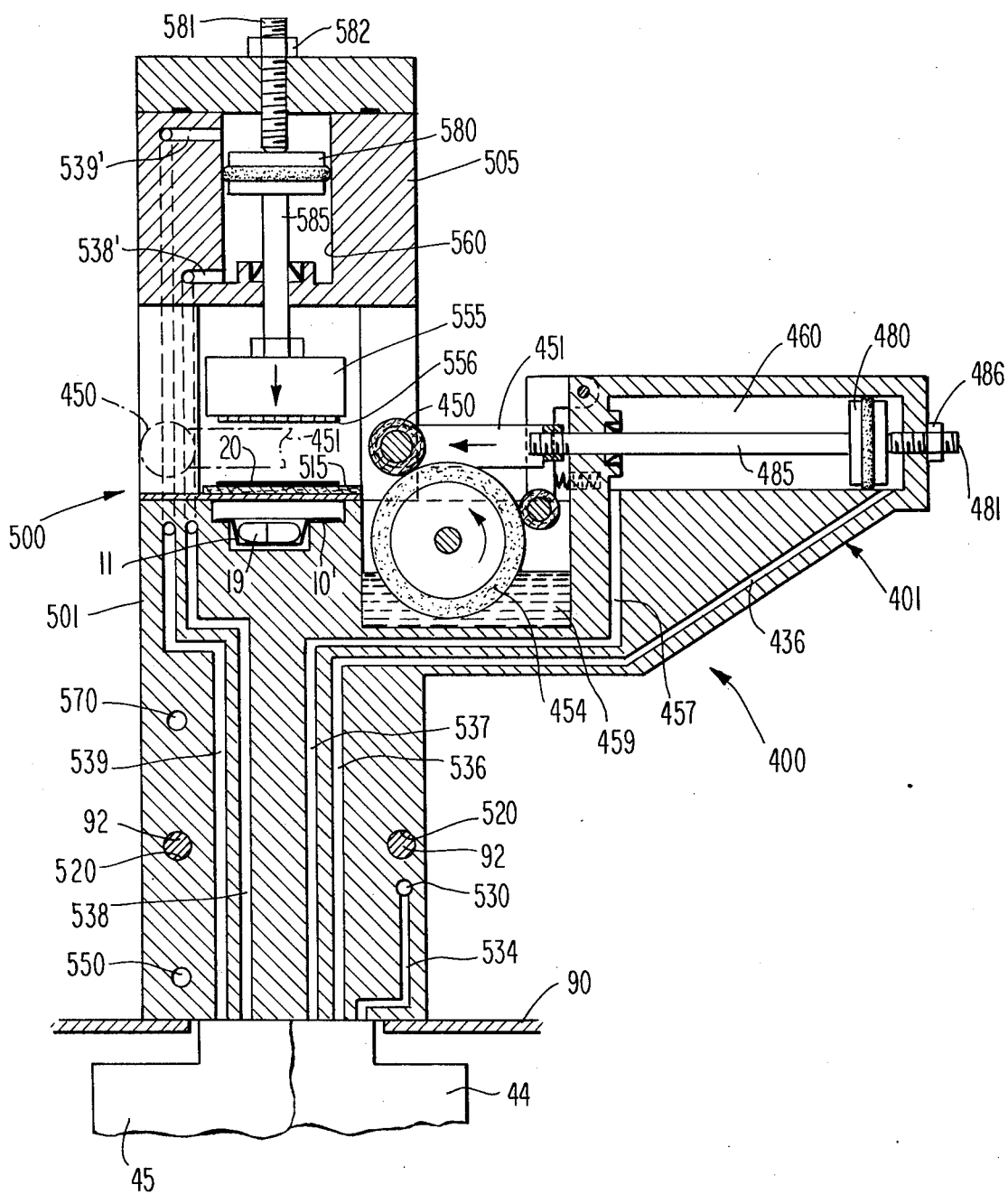
FIG. 18 is a transverse sectional elevation, taken at XVIII—XVIII on FIG. 14, showing the machine module for inking and printing the backing strip.

INK station 400 is shown at the right, supported on the side of PRINT station 500 at the left, in FIGS. 12, 18. INK valve 44 and PRINT valve 45 are shown fragmentarily underneath block 502 of the latter station and are interconnected to continuous high-pressure air bore 530 by suitable bores (534 to valve 44 being shown). Bores 536, 537 lead from the ink valve through the print block to interconnection with bores 436, 437 in ink housing 401, where the latter bores communicate with opposite ends of cylinder 460. Piston 480 on one end of rod 485 is biased against adjusting screw 481 retained by nut 482 at the right end of the cylinder by air-flow from bore 437 at the left, bringing the surface of ink roll 450 against the surface of lick roll 454, which dips into ink reservoir 459 and is rotated by INK motor 54a (FIG. 11). Doctor roll 455 removes excess ink from the lick roll so as to coat the ink roll evenly. Switching of the ink valve removes the air pressure from bore 437 and applies it to bore 436, forcing the piston to the left and rolling the ink roller along type 556 on the under surface of print platen 555, the extreme alternative position of the ink roll and its support 451 being indicated in broken lines.

Print block 501 has cap 505, secured at the top to receive continuations 538', 539' of bores 538, 539 from PRINT valve 45. Vertical cylinder 560 in the cap holds piston 580 biased upward against adjusting screw 581 retained by nut 582 at the top. Rod 585 on which the piston is supported extends into the block proper and carries print platen 555 at its lower end. Rigid separator strip 515 supported by the block extends horizontally between formed blister strip 10' and overlying backing strip 20, which is supplied from the second reel immediately upstream of the print station. It will be understood that the print platen is inked by the reciprocating ink roll during the intermittent transporting of the two strips and that the print platen is lowered during a dwell in the transporting, by switching of air pressure by PRINT valve 45 from bores 539, 539' to bores 538, 538' by the print valve, to impress the inked type on the exposed face of the backing and thereby print it. The impact of the print platen is borne by the backing strip supported on the rigid separator strip.

SEAL station 600, shown primarily in FIGS. 14 and 19, secondarily in FIG. 20, receives the juxtaposed printed backing strip and filled blister strip next. Seal block 601 is supported on machine base 90 and has cap 605 with heater 56a (FIG. 11) in it. The block contains bores 620 receiving bolts 92, continuous 630 and valved 650, 670 high-pressure bores in register with those of the preceding print block (and the succeeding drive block). Vertical cylinder 660 in the seal block contains piston 680 on the lower end of rod 685, which carries at its upper end sealing head 610, shown in plan in FIG. 20. Rectangular central part 611 of the head is recessed to accommodate blister-like protrusion 11 on strip 10'. Peripheral region 612 of the head is embossed or patterned suitably for heat-sealing the strips together under pressure without undesired distortion. Right edge 613 of the head is relieved so as not to force the respective strips together along that margin.

The piston is in the illustrated down or open position durng transporting of the strips but is forced upward by switching of the air pressure from the port above the piston to the port below it by programmed switching of main valve 42 to interchange air pressure from bore 670 to 650 during a dwell in the transporting. Impact of the sealing head against the lower surface of the blister strip forces it upward against the backing strip and holds them both against the heated lower surface of the cap so as to seal them together in combined strip 30 about the periphery of the hollow holding the capsule but leaving one margin 31 unsealed along with the edges between adjacent package portions of the combined strip. Subsequent reversal of the air pressure releases the piston and sealing head for further package strip transport.

DRIVE station 700, shown in FIGS. 14 and 21, comprises block 701 and housing 707 extending laterally to accommodate the mechanism for transporting the package strip intermittently for treatment at the respective stations. DRIVE valve 47 is supplied with continuous high-pressure air through bore 734 from longitudinal bore 730, and bores 736, 737 lead from the valve to vertical cylinder 760 and terminate in lower and upper ports, respectively, below and above piston 780 on rod 785, which is shown in the down position corresponding to pressure from bore 737. Carried on the far side of the piston rod is rack 787, which engages a pinion gear (not visible) on drive barrel 792, which is mounted between pair of one-way clutches 791, 793 on shaft 790. Adjusting screw 781 with nut 782 in the top of the righthand part of the block abuts the end of the piston rod in the up position to control its travel. The left portion of the shaft carries wide drive roll 796 and narrow drive roll 798 with spacer 797 therebetween. Located thereabove are pair of idler rolls 716 and 717, with spacer 797 therebetween. These idler rolls are supported in an assembly 715 pivoted on pin 711 and comprising handle 705 and pins 704, 706 extending vertically at respective opposite sides onto pair of compression springs 703, 708 in blind bores in the top face of the drive block. The margins of packaging strip 30 are nipped between the respective pairs of rolls. When the drive piston is raised, righthand clutch 791 (from shaft 790 to housing 707) disengages, and lefthand clutch 793 (between the pinion gear and the shaft) engages, rotating the drive rolls and transporting the packaging strip one increment, preferably between a half inch and an inch (e.g., 0.8 inch). Then when the drive piston is lowered, the latter clutch disengages and the former clutch engages so the shaft will not tend to rotate in the reverse direction and thereby disturb the positioning of the strip.

PERFORATE station 800 is shown in FIG. 14 and fragmentarily (upper part only) in FIG. 22. The portion not shown is identical with the corresponding part of SEAL station 600 shown in FIG. 19. Cap 805 for block 801 of this station carries perforating knife 810 supported on springs 803, 807 in piece 815 attached to the cap so that upward pressure against the knife will force it upward against compression of the springs. Head 890, similar to seal head 690 (but not patterned) forces packaging strip 30 upward against the knife when the perforating piston (not shown) rises. The resulting perforation occurs transversely from side to side of the strip on the narrow unsealed boundary between adjacent package portions. Both lower and upper pistons 880, 880' on single rod 885 are used here (FIG. 14) to increase the force of impact sufficiently for positive perforation. Valved air passage 870 is ported to upper cylinder 860' above the upper piston, while lower valved air passage 850 is ported to lower cylinder 860 below the lower piston. The piston operation is effected by switching of the air pressure therebetween by the main valve.

CUT-OFF station 900 shown in FIGS. 14 and 23 is similar to the preceding station, but with only a single piston and with knife 990 in place of head 890 and with CUT-OFF valve 49 active in addition to the main valve actuation of that preceding stage. Added bore 934 leads to the cut-off valve from continuous high-pressure bore 930, and bore 935 leads from the valve to cylinder 960 for piston 980 on rod 985 which carries the knife at its upper end. It will be understood that air-flow from bore 970 above the piston keeps it in the down position during transporting of the strip and that switching of the main valve applies the air pressure below the piston instead and is aided by similar application of air pressure thereunder from the continuous high-pressure supply by concurrent switching of the cut-off valve. The cut is made along a line of perforations made at the preceding station. Guide 915 is secured to cap 905 but spaced to accommodate the knife. Cut-off package portion 31a' is shown sliding down exit chute 99. Unless the packaging strip is being cut into single unit-dose packages, a COUNT step (FIG. 9) is performed in any suitable mechanical or electrical fashion to determine the number of such package portions emitted in a single strip between successive cuts of the knife.

Programming of these various operations for treatment of the packaging strips according to the present invention will be readily understood in the light of preceding description and the following timetable and explanation. The timetable illustrates that all active treating operations (guiding being merely a passive operation) are programmed to occur during dwell time between successive transporting steps. Thus, all active steps take place in the first half of the operation cycle, many of them at the instance of the main valve which is actuated throughout substantially all of that half cycle, while the driving or transporting occurs only for about one-third of a cycle and is separated in time from both the beginning and the end of the first half cycle. Similarly, the incompatible operations of inking and printing are scheduled to occupy mutually exclusive portions of the first half cycle.

| Stations | | Tenths of Operating Cycle | Via Valves | |
|---|---|---|---|---|
| No. | Name | 0 1 2 3 4 5 6 7 8 9 | Main | Other |
| 100 | Guide | 0 ———— 5 | No | None |
| 200 | Form | 0 ———— 5 | Yes | — |
| | | 0 ———— 5 | — | Aux. 42a |
| | | 0 — 3 | — | Form 42 |
| 300 | Fill | 0      5 | — | — |
| 400 | Ink | 1 2 | No | Ink 44 |
| 500 | Print | 3 — 5 | No | Print 45 |
| 600 | Seal | 0 ———— 5 | Yes | None |
| 700 | Drive | 6 — 9 | No | Drive 47 |
| 800 | Perforate | 0 ———— 5 | Yes | None |
| 900 | Cut-Off | 0 ———— 5 | Yes | — |
| | | 1 — 4 | — | Cut-Off 49 |

No unusual materials or components are required in the construction or operation of the packaging machine illustrated and described in this application. Conventional methods and materials of construction for similar machinery are suitable. The heat-deformable strip in which the blister-like protrusions are formed may be of so-called "vinyl" material, such as polyvinyl chloride. The backing strip is conveniently a laminate of metal foil (to seal the hollows in the blister strip) and paper, which receives the printing.

The modular construction of the component stations of the machine of this invention, i.e., a desired number of transport increments, plus half such an increment to dephase for treating the packaging strip between package portions instead of centered thereon, permits addition and interchange of components at will. Conduction of pressurized actuating fluid from face to face through the component station blocks eliminates the necessity of disconnecting airlines, etc. when inserting or removing blocks (except the guide block, which receives such connections). Valve pressure connections are made similarly through the bases of the blocks. If a preprinted backing strip is used, for example, the ink and print stations can be removed simply and the perforate station be attached to the seal station. Contrariwise, if multi-color printing of a backing is desired, a second printing station can be inserted contiguous with the one already in the machine just as easily.

The machine itself is compact enough to rest on a standard sized desk, with the reels and strip pathways at convenient height for an operator to oversee the operation and to handfill the package strip if manual filling is employed. It runs cool because of the air-flow in the blocks of all the stations. The full advantages and benefits of this machine and its operation and the packaging methods embodied in it will become apparent to those persons who undertake to use it.

The module width can be multiplied to accommodate double (etc.) width strips for formation of side-by-side unit-dose packages, if desired. Such a strip may be pre-perforated longitudinally, or a longitudinal perforating knife may be added in the perforation stage of the machine. In either event the waste-free packaging method of this invention will be retained.

Although the invention has been described principally for the packaging of medicaments, such as in pill, lozenge, or capsule form, it is equally suitable for packaging of other articles, preferably though not necessarily in discrete solid form, such as components of electronic apparatus, jewelry, watch movements, or other articles that are subject to contamination, damage, loss, or theft if shipped in bulk. Of course, the shape of the blister hollow may be altered to suit the articles being packaged.

A preferred embodiment of machine has been disclosed here, together with some adaptations or modifications. Other modifications may be made therein, as by adding, combining, or subdividing parts or steps, while retaining all or many of the advantages of the present invention, which itself is defined in the following claims.

I claim:

1. In a blister-packaging machine wherein packaging material is treated at a succession of fluid-actuated stations arranged in-line and along which the packaging material is transported, including treatment means at the respective stations, including means for transporting the packaging material from station to station intermittenty and wherein the respective treatment means are programmed to treat the packaging material at dwell times in such intermittent transporting, and including conduit means for supplying actuating fluid to one of the stations, the improvement comprising a base for supporting the treatment stations in mutual alignment, the respective stations upstanding from the base and having material-supporting surfaces at a given height, abutting one another in sequence in the transport direction, and having registering bores therein for flow of actuating fluid directly from station to abutting station, beginning with the station to which the fluid is supplied by the conduit means, valve means for controlling the supply of actuating fluid to the respective treatment means, and programming means for timing such control valve actuation, to form a striplike succession of blister packages.

2. Packaging machine according to claim 1, wherein the transporting means grips the packaging material continuously along its opposite edges at one of the treatment stations.

3. Packaging apparatus according to claim 1, wherein the stations include, in sequence blister-forming, filling, sealing, and perforating stations for the packaging material.

4. Packaging apparatus according to claim 3, including also transporting, printing, and cut-off stations for the packaging material.

5. Packaging machine according to claim 1, wherein the respective in-line stations have a plurality of sets of bores therein registering with like bores in each abutting station, and including valve means located between the fluid supply means and the station connected thereto and effective to supply actuating fluid at one set of the registering bores and to enable such actuating fluid to be exhausted from another set of the registering bores.

6. Packaging machine according to claim 5, wherein the respective stations also have another set of registering bores for continuous supply of actuating fluid therethrough.

7. In a blister-packaging machine wherein striplike packaging material is treated at a succession of in-line stations along which it is transported intermittently, the improvement comprising a first support for a supply of striplike material adapted to having a succession of blister-like indentations formed therein, means at one station for forming such blister-like indentations therein, a second support for a supply of striplike material adapted to be juxtaposed against the indented face of the first striplike material with the contents to be packaged located in the indentations therebetween, means at another station for sealing the respective striplike materials together, means at yet another station for perforating the resulting package structure transversely between successive blister locations, and means at still a further station for separating the resulting striplike package material transversely along some transverse perforations to leave a desired number of such sealed indentations in a continuous strip thereof, wherein the forming station comprises heating means overlying the first striplike material for heating it at a locus overlying an indentation in an underlying material-supporting surface, conduit and valve means for alternately applying compressed fluid to the underside of the striplike material to force it upward into proximity with the heating means to soften it and then downward into the indentation to form it into blister configuration, including a station at which the resulting indentations of the first striplike material may be filled with contents before having the second striplike material sealed thereagainst.

8. In a blister-packaging machine wherein striplike packaging material is treated at a succession of in-line stations along which it is transported intermittently, the improvement comprising a first support for a supply of striplike material adapted to having a succession of blister-like indentations formed therein, means at one station for forming such blister-like indentations therein, a second support for a supply of striplike material adapted to be juxtaposed against the indented face of the first striplike material with the contents to be packaged located in the indentations therebetween, means at another station for sealing the respective striplike materials together, means at yet another station for perforating the resulting package structure transversely between successive blister locations, and means at still a further station for separating the resulting striplike package material transversely along some transverse perforations to leave a desired number of such sealed indentations in a continuous strip thereof, including a station with vertically reciprocable overlying print block means for printing the exposed face of the second striplike material and a laterally adjoining inking station with a lick roll in an ink reservoir and with horizontally reciprocable ink roll means adapted to transfer ink from the lick roll in the print block means when raised out of contact with the underlying striplike material.

9. In a blister-packaging machine wherein striplike packaging material is treated at a succession of in-line stations along which it is transported intermittently, the improvement comprising a first support for a supply of striplike material adapted to having a succession of blister-like indentations formed therein, means at one station for forming such blister-like indentations therein, a second support for a supply of striplike material adapted to be juxtaposed against the indented face of the first striplike material with the contents to be packaged located in the indentations therebetween, means at another station for sealing the respective striplike materials together, means at yet another station for perforating the resulting package structure transversely between successive blister locations, and means at still a further station for separating the resulting striplike package material transversely along some transverse perforations to leave a desired number of such sealed indentations in a continuous strip thereof, wherein the means at each of the stations are actuated by pressurized fluid supplied thereto from conduit means connected to one station and then via registering bores in the respective stations, which abut one another in line.

10. In a blister-packaging machine wherein striplike packaging material is treated at a succession of in-line stations along which it is transported intermittenty, the improvement comprising a first support for a supply of striplike material adapted to having a succession of blister-like indentations formed therein, means at one station for forming such blister-like indentations therein, a second support for a supply of striplike material adapted to be juxtaposed against the indented face of the first striplike material with the contents to be packaged located in the indentations therebetween, means at another station for sealing the respective striplike materials together, means at yet another station for perforating the resulting package structure transversely between successive blister locations, and means at still a further station for separating the resulting striplike package material transversely along some transverse perforations to leave a desired number of such sealed indentations in a continuous strip thereof, including drive means for transporting the striplike material intermittently and comprising roll means for engaging edge portions of the striplike material, reciprocating rack means, pinion means including a shaft and a gear engaging the rack means, and first clutch means intermediate the pinon means and the drive roll means and adapted to rotate the drive roll means and thereby to transport the strip when the rack means moves in one direction of reciprocation and to disengage the pinion from the drive roll means when the rack means moves in the opposite direction of reciprocation and thereby to provide a dwell in such transporting of the striplike material.

11. Packaging machine according to claim 10, wherein the clutch means includes also second clutch means intermediate the drive roll means and a fixed part of the station and adapted to disengage the pinion shaft from the fixed part when the rack means moves in the first direction of reciprocation and to engage when the rack means moves in the opposite direction of reciprocation and thereby to preclude the roll means from rotating opposite to the transport direction.

12. A table-top machine for producing unit-dose blister packages of medicaments, comprising a base adapted to rest on a table or the like, a succession of fluid-actuated stations supported in mutual alignment with adjacent stations abutting one another and having registering bores therein for flow of actuating fluid from station to station, the stations having strip-supporting surfaces at a given height for treatment, means for supplying a heat-deformable blister strip at the first station, means for supporting a backing strip at a subsequent station, one of the stations including edge drive means for transporting the respective strips along the strip-supporting stations from their respective supply locations, a blister-forming station including means for forming successive medicament-receiving blisters in the first strip by heating it and applying fluid pressure thereto to deform it into blister configuration as successive portions thereof arrive and then cooling it, a blister-filling station at which medicaments are insertable into the successive blisters, the forming and filling stations being located in sequence between the supply locations for the first and second strips, a sealing station including means for sealing the backing strip to the blister strip and thereby enclose the medicaments in the blisters of the resulting package strip, plus a printing station for printing the exposed face of the backing strip, a perforating station for perforating the resulting package strip transversely between successive blisters, and a cut-off station for severing the package strip at tranverse perforation locations, and means for programming the actuation of the respective stations.

13. Packaging machine according to claim 12, wherein the base is hollow and contains the programming means together with connections and valves for actuating fluid and electrical leads for heating, programming, and drive means.

14. Packaging machine according to claim 12, including, in sequence a guiding station for receiving the first strip from its supply, the blister-forming station, the blister-filling station, the printing station, and the sealing station, and wherein the driving station, the perforating station, and the cut-off station follow the sealing station.

* * * * *